United States Patent [19]
Right

[11] Patent Number: 4,513,284
[45] Date of Patent: Apr. 23, 1985

[54] CONSOLE PRIORITY CONTROL

[75] Inventor: Robert W. Right, Huntington, Conn.

[73] Assignee: General Signal Corporation, Stamford, Conn.

[21] Appl. No.: 478,430

[22] Filed: Mar. 24, 1983

[51] Int. Cl.[3] .............................................. H04Q 9/00

[52] U.S. Cl. ............................ 340/825.51; 340/311.1; 381/82

[58] Field of Search ...................... 340/825.51, 825.03, 340/311.1; 381/82, 77; 364/200

[56] References Cited

U.S. PATENT DOCUMENTS

| | | | |
|---|---|---|---|
| 3,370,272 | 2/1968 | Kenedi | 340/825.51 |
| 3,469,151 | 9/1969 | Newland | 340/825.03 |
| 4,334,288 | 6/1982 | Booher | 364/200 |
| 4,366,480 | 12/1982 | Van Hatten | 340/825.51 |

OTHER PUBLICATIONS

IBM Technical Disclosure Bulletin, vol. 5, No. 7, Dec. 1962, pp. 1-3, "An Addressing, Scanning and Instruction System for Cascaded Multiplexing", R. J. Furlong et al.

*Primary Examiner*—Donald J. Yusko
*Attorney, Agent, or Firm*—Ronald Reichman; Jeffrey S. Mednick; George W. Killian

[57] ABSTRACT

In various types of systems it is expedient to have a plurality of control consoles, each assigned a relative priority so that they may control the associated equipment in a predetermined hierarchy. The priority wiring requires only a pair of wires from one console to the next. A higher priority console, when activated, disables all lower priority consoles in the hierarchy and an indicator at each disabled console is activated to indicate the disablement. The indicator at the active console is not activated and the indicator at the highest priority console is, of course, never activated. Power to activate the disablement indicators is provided from the higher priority active console.

9 Claims, 1 Drawing Figure

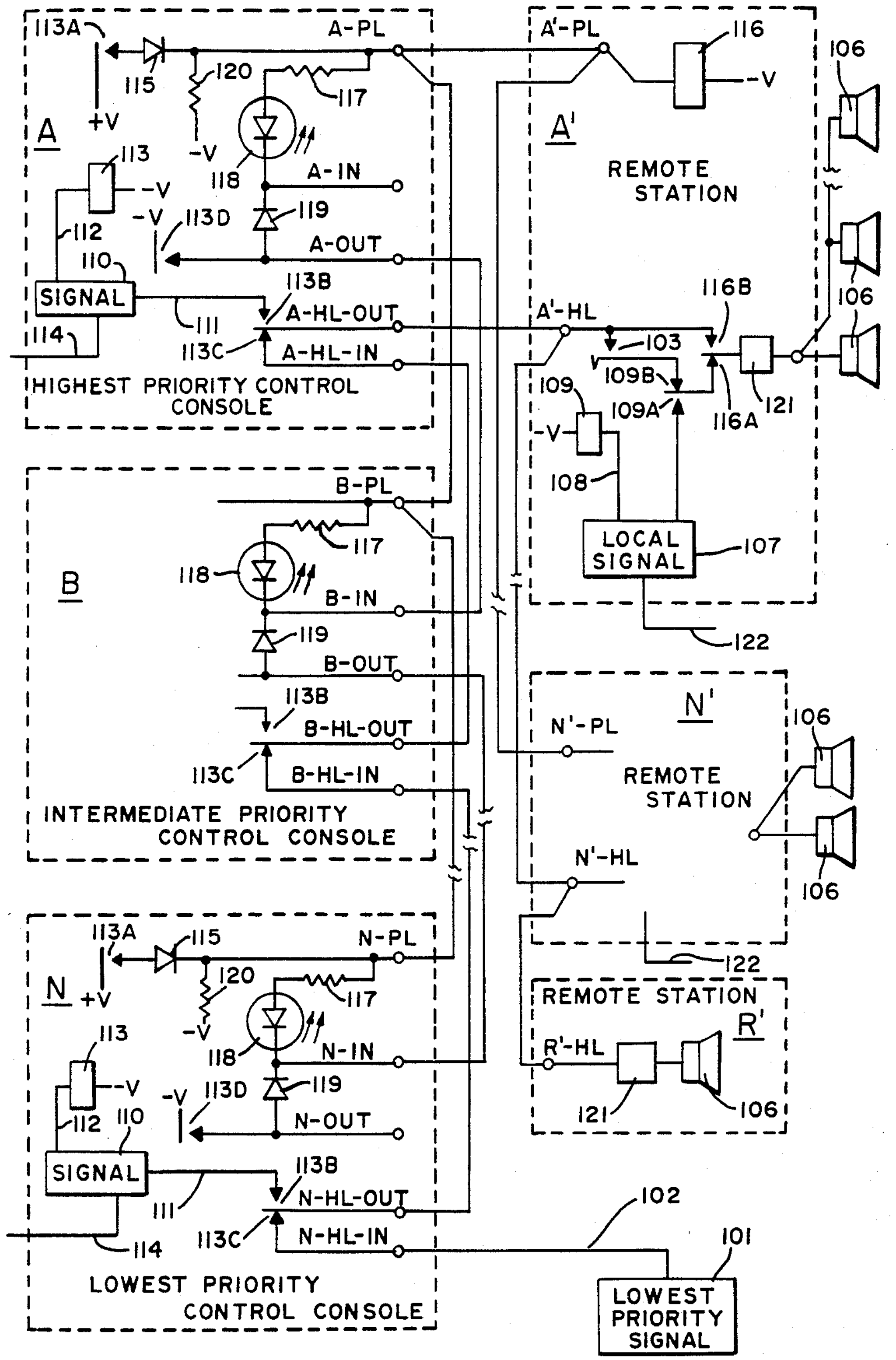
113A
A-PL
115
120
117
+V
A
-V
113
-V
118
A-IN
-V
113D
119
112
A-OUT
110
113B
SIGNAL
A-HL-OUT
111
114
113C
A-HL-IN
HIGHEST PRIORITY CONTROL CONSOLE
A'-PL
116
-V
106
A'
REMOTE STATION
116B
106
A'-HL
103
109B
109
121
109A
116A
-V
108
LOCAL SIGNAL
107
122
B-PL
117
B
118
B-IN
119
B-OUT
113B
B-HL-OUT
113C
B-HL-IN
INTERMEDIATE PRIORITY CONTROL CONSOLE
N'
N'-PL
106
REMOTE STATION
N'-HL
106
122
REMOTE STATION
R'
R'-HL
121
106
113A
115
N-PL
120
N
+V
117
113
-V
118
N-IN
-V
113D
119
112
110
N-OUT
SIGNAL
113B
111
N-HL-OUT
113C
N-HL-IN
114
LOWEST PRIORITY CONTROL CONSOLE
102
101
LOWEST PRIORITY SIGNAL

CONSOLE PRIORITY CONTROL

BACKGROUND OF THE INVENTION

In a wide variety of situations and circumstances, it is convenient to provide a plurality of strategically located audible signals which are used for a wide variety of purposes frequently including one or more of the following: background music; paging; announcements; advertisements; and a variety of alarms. Furthermore, any of these audio signals may be applied to less than the total plurality of audio devices. As an example, such as system might be used in a large department store to provide background music in a least selected areas during part of the time when the system is not otherwise engaged. At some time it might be appropriate to have an announcement made within a specific department, or on one floor, concerning an event or conditions of interest only to people within that department or on that floor. At such times, it is desirable to be able to provide signals through less than all of the audio devices. At other times, a situation may exist wherein it is desirable to produce a paging, announcement or alarm signal on all of the audio devices and do so with priority over the background music and/or more local alarms, announcements or signals. Furthermore, a situation can readily be envisioned wherein it is desired to produce a general page or alarm, from some principal control point such as the main office; and at other times to produce such general page or alarm signals from another area such as a guard station; and at other times to produce paging or alarm signals generated from an alternate guard area or an annex building. Other situations and needs for announcements and/or signals from other areas may be readily envisioned. The system may also find utility in high rise buildings.

It will be seen that such systems may be rather complex and that in order to prevent confusion which would result if more than one message, or signal, was being applied to the audio devices simultaneously, it is desirable to have the system arranged with a predetermined hierarchy or priority in such manner that in times of emergency the system can be commandeered and used by the highest priority transmitting area.

U.S. Pat. No. 3,656,158 issued Apr. 11, 1972 to Harry C. Goodwater, described a low voltage audio fire alarm system fully integrated into a paging and music speaker system. This system is particularly directed to supervision of the system and components. However, it does disclose a system providing paging, background music and alarm signals through an audio system. Various manufacturers provide a wide variety of paging, alarm and background music systems. One such producer, the Federal Signal Corporation, does provide a system that permits the use of two command units in one system. However, two signals may be present on the signal line should both command unit be keyed simultaneously. Modification can permit use of two command units although use of more than two command units can result in their destruction if keyed simultaneously.

It is an object of the present invention to provide a new and improved paging and alarm system with signals capable of being originated from any one of a variety of locations.

It is another object of the system to be able to control less than all of the audio devices from remote locations.

It another object of the invention to be able to control selected audio devices locally.

It is another object of the invention to provide a control console which may control all of the audio devices.

It is a more specific object of the invention to provide a control console which can provide audio signals to remote audio devices and override audio signals applied to any or all of the audio devices from remote control stations.

It is another object of the invention to provide a plurality of control consoles any one of which may provide audio signals to the remote audio stations with priority over locally generated signals.

It is another object of the invention to provide a system including a plurality of control consoles which are identical but interconnected in a hierarchy system.

It is another object of the invention to provide an alarm signalling, paging and background system wherein the background music has the lowest priority with increasing priorities in the following named sequence: a signal generated from a remote source and normally directed to less than all of the audio devices; a priority signal generated from the same remote station and having a priority over the previously named signal; a tone from one of the control consoles; a priority tone from one of the control consoles; a tone manually selected from a keyboard at one of the consoles; a test mode condition and voice paging.

It is another object of the invention to be able to provide the automatic tone, the automatic priority tone, the manually operated tone, the test mode and the paging from any one of the plurality of control consoles.

It is another object of the invention to arrange the control consoles in a predetermined hierarchy so that any action at any of the control consoles has priority over the action of a lesser priority console.

It will not be here attempted to set forth and indicate all of the various objects and advantages incident to the invention, and other objects and advantages will be referred to, or else will become apparent from the following description.

SUMMARY OF THE INVENTION

The priority system of the invention comprises a plurality of control consoles wired in a predetermined hierarchy configuration to control a plurality of remote stations. Each remote station may include a plurality of auto signal devices and include means for selectively generating one of a plurality of signals which may be applied to the audio devices. One of the plurality of signals may be a priority signal which will take preference over any of the others which may be in progress at the time of the origination of the priority signal. If none of the control consoles are placed in an active mode a background audio signal, usually music, is coupled through the control consoles and applied to the remote stations. Any of the remote stations may include means for rejection of the background audio signal. Generation of the local signals will have priority over the background signal. Each console may receive signals, including an alarm signal, coupled directly thereto which will be applied to each of the remote stations provided only that no control console in a higher position in the hierarchy is active. In addition, each control console includes a manual keyboard which can apply any of the tones from that control console to the remote stations provided only that the control console has not been disabled by activation of one of the control consoles in a higher position in the hierarchy. Any activated control console provides a signal to all lower priority control consoles indicating that they have been disabled. Any control console which has not been disabled may also place a voice paging signal from the control console to the remote stations.

The wiring from the plurality of control consoles to the remote stations comprises a priority control lead and a pair of audio signal leads. The audio signal leads are passed through each of the control consoles in series in the hierarchy sequence such that activation of any control console disconnects the audio leads from lower priority control consoles. When any control console is activated, it reverses the polarity on the priority control lead to the remote stations and to all control consoles. A light emitting diode, constituting a disable signal, is activated in each lower priority control console with current from the priority control lead and returning to the activated control console.

BRIEF DESCRIPTION OF THE DRAWING

To permit incisive and detailed analysis of the operational characteristics of this invention, a single FIGURE of a schematic drawing showing specific, pertinent circuitry is provided. It should be understood that each console and remote station includes additional equipment which is well known and not illustrated herein as it does not comprise a portion of the inventive concept and would only tend to obscure the inventive concept. The drawing discloses one form of the invention and is not meant in any way to delimit its scope, it is rather so drawn as an aid in an understanding of the invention. Standard electrical symbols are used.

DESCRIPTION OF THE PREFERRED EMBODIMENT

Examination of the drawing, will disclose a plurality of control consoles with one shown in the upper left-hand corner of the drawing and desigated "A" and further disignated as the highest priority control console. In addition, there is an intermediate priority control console designated "B" and a lowest priority control console designated "N". It should be understood that there may be any number if intermediate priority control consoles coupled into the system between console B and console N and that each of the consoles A through N are normally identical and interconnected in the manner illustrated and to be explained more fully hereinbelow. In addition to the plurality control consoles, there is also a plurality of remote stations including remote station A' through N' with any number of additional remote stations coupled therebetween. There may also be a plurality of remote station R' which do not include all the features of stations A' to N'.

As will be seen, the system lends itself to providing various types of alarms and/or paging signals as the need may arise and for providing background music or other desired audio signals at other times. Under normal operating conditions, the background music is considered the lowest priority signal and the source of such signal is designated 101. It should be understood that the box designated lowest priority signal 101 comprises all necessary power supplies, amplifiers, tuners, record and/or tape equipment, etc. as may be appropriate for use in the system. The signal source 101 could include low priority page or announcement equipment if desired. The audio signal from the lowest priority source 101 is applied on a pair of audio leads, represented herein as a single line, 102, which is wired to the lowest priority control console at a terminal designated N-HL-IN. As will be explained more fully hereinbelow, a circuit is completed through the N control console and extends out of the N control console on the lead designated N-HL-OUT from whence it is coupled through other control consoles in like manner, including into the B control console on the B-HL-IN lead and out therefrom on the B-HL-OUT lead and thence to the A-HL-IN lead of the A control console and exits therefrom on the A-HL-OUT lead to the A'-HL lead of the A' remote station and to the N'-HL lead of the N' remote station and to the R'-HL lead from R' remote stations.

As may be seen, each of the control consoles has a priority lead designated PL and preceded by a letter corresponding with the designation of the associated control console. All of these priority leads from the control consoles are coupled together and to the priority lead of each remote station which is designated by the letters PL preceded by the designation of the associated remote station. The remote stations R' do not require the PL lead.

From the foregoing, it will be seen that an audio signal from the source 101 will pass through the HL-IN lead and HL-OUT lead of each of the control consoles in series and be applied to the HL lead of the plurality of remote station A' to N' and R'. At each of the remote stations A' to N', there is a circuit connection such as switch 103 which may be selectively opened or closed. As an alternative rather than use a switch, it could be a wire connection which is cut when the connection is not desired. In any event, if the circuit designated as switch 103 is closed, it will be seen that the audio signal on the A'-HL lead will pass through the circuit 103 and through normally closed contacts 109B and 116A to one or more loud speakers 106. It should be understood that, if necessary, the remote station A' or N' could include an additional amplifier 121 for amplifying the audio signal applied to the loud speakers 106. Providing the circuit 103 in a remote station is closed, the lowest priority audio signal applied to the A'-HL input lead will be applied to the loud speakers 106.

Associated with each of the remote stations A' through N' is a local signal source 107 which may conveniently and expeditiously comprises a signaling device having several of the features disclosed in U.S. Pat. No. 4,280,123, issued on July 21, 1981 to Robert W. Right, et al. It should also be understood that the local signal source 107 may comprise any other type of signaling system, including a paging system, if desired. The signaling device described in the mentioned Right, et al patent can selecitvely provide any of a variety of tones and includes means for granting one of the tones priority over all other tones so that if the local signal source 107 is producing one of the non-priority tones and a condition is created that requires the production of the priority tone, such priority tone will take precedence and be generated by the local signal source 107. The local signal source 107 is activated by a signal on input line 122 which represents a plurality of possible input lines.

When the local signal source 107 generates either a non-priority or priority tone, it will apply a potential on lead 108 to operate the relay 109 in the associated remote station. In response to the operation of the relay 109, the transfer contacts will operate thereby opening the contacts 109B and closing the contacts 109A. It will be recalled that the background music or other audio signal from source 101 was applied to the speakers 106 of remote station A' through contacts 109B. Accordingly, opening the contacts 109B will terminate the background music to the loud speakers 106 and the closure of contacts 109A will cause the audio signal from the local signal source 107, associated with remote station A', to be applied to the loud speakers 106. By this means, it will be seen that at the remote station the application of tones from a local signal source 107 has priority over the distribution of the background music. Furthermore, even if the circuit 103 is not complete for the application of background music to the loud speakers 106, the signals from local source 107 will be applied to the speakers 106. That is, the tones from the local signal source 107 are normally used to indicate an abnormal or alarm condition which it is desired to have broadcast through the speakers 106 and no means is provided for interrupting this signal. However, the local signal source 107 may include its own priority system for causing a selected tone to be applied when two or more abnormal or alarm conditions may exist concurrently. Other remote stations through N' function in the same manner.

In summary, the lowest priority audio signal applied to the speakers 106 may originate from source 101 and such signal will be automatically interrupted if the local signal source 107 associated with a remote station A' to N' is activated to cause an audio signal to be applied through contacts 109A and 116A to the speakers 106. Further, the local signal source 107 may have its own priority system for applying audio signals leading to the contacts 109A.

It should be understood that the local signal source 107 associated with the remote station A' will apply signals only to the speakers 106 associated with the remote station A'. The local source 107, associated with the remote station N' can, in like manner, cause an audio signal to be applied to the speakers 106 associated with the remote station N'.

Each of the control consoles A through N' has priority over any of the local signal sources 107. That is, if an operator or automatic equipment associated with one of the control consoles calls for the application of an audio signal to the system, such audio signal will have priority and be applied to all of the speakers 106 after disconnecting the background music and/or any signals from the local signal sources 107.

Considering now, more specifically, the control consoles A through N it should be understood that the internal wiring of each control console is normally identical and includes additional circuitry besides the shown herein. Included within each of the control consoles is a signal source 110, which may have some of the characteristics and features of the local signal source 107. That is, the signal source 110 includes an output lead 111 and a control lead 112 for activating a relay 113. The relay 113 actuates contacts 113A, 113B and 113C. The signal source 110, as stated, may have characteristics in common with the local signal source 107 in that it is capable of applying any of a plurality of audio output signals to output lead 111 with such signals applied automatically in response to a signal on one or more of a plurality of input leads indicated generally as 114. One of the signals may be organized to have priority over all remaining signals. Further, the signal source 110 may include a keyboard which permits manual initiation of any one of the signals, including a priority signal. In addition, there may be associated with the signal source 110 a microphone, and an associated talk switch which permit paging operation when required.

In response to activation of the signal source 110 over the control lead 114 or by an associated keyboard, a signal will be placed on control lead 112 to operate relay 113 which will, in turn, activate the relay contacts 113A, 113B and 113C. It will be immediately evident that the opening of the contacts 113C will terminate the transmission of background music signal from source 101 that had been applied in series through all the control consoles to each of the remote stations. The audio signal from the source 110 will be applied through the lead 111 and closed contacts 113B to the A-HL-OUT lead to each of the remote stations. By this means, audio signals from the source 110 may be applied from the control console A to the remote stations. Concurrently with the application of the audio signal as described, the closure of contacts 113A provides a positive voltage through diode 115 to the A-PL lead to the remote station and the A'-PL lead to activate relay 116. It should be understood that each of the remote stations, A' through N', includes a remote relay 116 and that the described signal on the A-PL lead activates the relay 116 at each of the remote stations. In reponse to the activation of the relay 116, the contacts 116B are closed and the contacts 116A are open. With contacts 116 A open, the local signal source 107 cannot apply audio signals to the speakers 106 and the audio signal that is applied to the speakers 106 originates from signal source 110 and passes through the now closed contacts 116B. The remote station N' is similarily affected and the speakers 106 associated therewith also transmit the same signal. In like manner, the speakers 106 at remote Station R' are activated although no relay 116 is involved.

The A-PL lead from the control console A is also coupled to each of the other control consoles B through N and is applied as an input on the priority lead B-PL or N-PL and passes through resister 117 and light emitting diode 118 and, in the case of the B control console, returns on the B-IN lead to the A-OUT lead and a negative potential at contact 113D thereby illuminating the light emitting diode 118 of control console B which indicates that the intermediate priority control console B has been disabled. In like manner, the application of the positive potential on the N-PL lead on the N control console passes through the light emitting diode 118 of the N control console and returns through the N-IN lead and the B-OUT lead and diode 119 of the control console B to the B-IN lead on the same control console and to the A-OUT lead of the A control console and the negative potential at contact 113D. Accordingly, activation of the signal circuit 110 of the A control console will result in illuminating the light emitting diodes 118 of each of the lower priority control consoles to advise any operator supervising their use that they have been taken out of service by a higher priority console. It should be understood that each of the control consoles include a relay 113 and any number of these relays 113 may be operated at any given time but the relay 113 in the highest priority activated control console will be effective to disable all lower priority control consoles. The open contacts 113C in the activated control console prevents audio signals from a lower priority console from being transmitted to the remote stations thereby effectively disabling the lower priority consoles. If two relays 113 are operated and the higher priority console completes its transmission and releases its relay 113, the next highest priority control console with an operated relay 113 is enabled to transmit signals from its signal source 110 to the remote stations.

In like manner, it will be seen that if the highest priority control console A is not activated, then the intermediate priority console B may be activated and that it will operate its relay 113 (not shown) to have the same result on lower priority control consoles that the operation of relay 113 of the control console A had.

If it is assumed that a high priority control console station is active, a start signal could be placed on an input lead 114 of a lower priority console and cause the operation of the relay 113 of the lower priority console. However, no signals from signal source 110 of the lower priority console will go to the remote stations as the contacts 113C of the higher priority active console are open. When the higher priority console becomes inactive, the next lower priority console with an actuated relay 113 will transmit its signal to the remote stations.

Since the control console A is the highest priority console, it can never be put out of service and therefore the light emitting diode 118 of the control console A can never be illuminated. Accordingly, the diode 118 could be omitted from console A although for convenience, economy and interchangeability, the consoles A to N are usually identical.

The diodes 119 are included in the control console circuits as without them, there could be a flow of current which would cause a lower priority control console to illuminate the light emitting disable diode of a higher priority control and give a false disabled signal. For example, if the control console B is activated, a positive pontential is applied to the B-PL lead which could pass through the disable diode 118 of the A control console and through the direct connection replacing diode 119, if diode 119 was not used, and return on the A-OUT lead to the B-IN lead and again through a direct connection if the diode 119 is not used in the B control console to a negative potential applied to the B-OUT lead by contacts 113D.

The resistor 120 is a terminating, or pull-down, resistor and provides a bias potential on the priority lead PL. The A-IN lead of the highest priority control console A has no external connection and the N-OUT lead of the lowest priority control console N has no external connection.

While there has been shown and described what is considered at present to be a prefered embodiment of the invention, modifications thereto will readily occur to those skilled in the related arts. For example, in another structure, solid state switching techniques would probably be used in place of electro mechanical relays and associated contacts which are used for illustrative purposes. It is believed that no further analysis or description is required and that the foregoing so fully reveals the gist of the present invention that those skilled in the applicable arts can adapt it to meet the exigencies of their specific requirements. It is not desired, therefore, that the invention be limited to the embodiment (shown and described), and it is intended to cover in the appended claims all such modifications as fall within the true spirit and scope of the invention.

What is claimed is:

1. In a priority control circuit the combination comprising:

(a) a plurality of identical control console circuits identified in order of declining priority A, B, . . . N;

(b) each of said control circuits including a priority lead coupled in common and extending to at least one controlled remote station for exercising control thereover;

(c) each of said control console circuits including means for normally coupling a potential of a first polarity, through a current-limiting resistor, to said priority lead;

(d) first circuit means responsive to the activation of any one of said control console circuits for coupling a potential of a second polarity to said priority lead;

(e) each of said control console circuits including an "In" and and "Out" lead with a first diode coupled therebetween to pass current in only one direction between said "Out" lead and said "In" lead;

(f) indicator means coupled between said priority lead and the "In" lead at each of said control console circuits;

(g) second circuit means responsive to the activation of any one of said control console circuits for coupling a potential of said first polarity to the "out" lead of the activated control console circuit; and (h) third circuit means coupling the "Out" lead of each control console circuit to the "In" lead of the next lower priority control console circuit.

2. The combination as set forth in claim 1 wherein said indicator means comprises visual means.

3. The combination as set forth in claim 2 wherein said indicator means comprises a light emitting diode.

4. The combination as set forth in claim 3 wherein said first diode and said light emitting diode are both poled to pass current to, or receive current from, said "In" lead.

5. The combination as set forth in claim 1 wherein said first and second circuit means are activated concurrently.

6. The combination as set forth in claim 1 and including an audio circuit threaded in series through normally closed circuit means in each of said plurality of control console circuits from said Nth console to said A console and extending from said console to said remote station.

7. The combination as set forth in claim 6 wherein said normally closed circuit means comprises part of transfer circuit means with the common terminal of the transfer circuit coupled to the normally closed terminal of the transfer circuit means in the next higher priority control console.

8. The combination as set forth in claim 7 wherein said control console includes means for operating its associated transfer circuit means and placing an audio signal on the normally open terminal of the transfer circuit means.

9. The combination as set forth in claim 7 wherein the common terminal of the transfer circuit means of said A priority control console is coupled to the audio line which extends to said controlled remote station.

* * * * *